No. 673,105. Patented Apr. 30, 1901.
W. YOUNG.
TREE TRIMMER.
(Application filed Jan. 21, 1901.)
(No Model.)
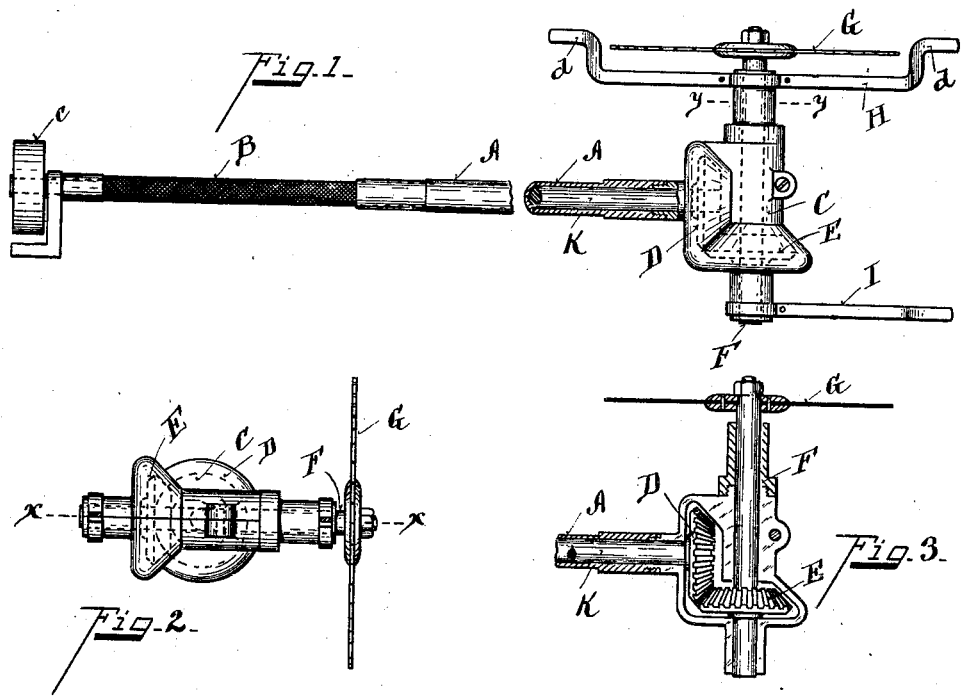
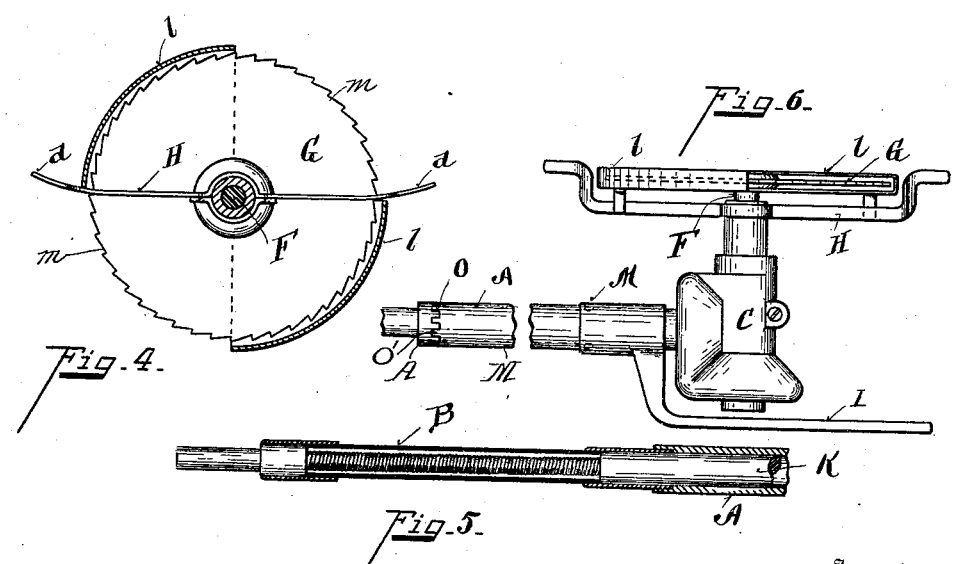
Witnesses
Oliver B. Kaiser
Pearl McMichael
Inventor
Wesley Young
By Wood & Wood
Attorneys

UNITED STATES PATENT OFFICE.

WESLEY YOUNG, OF DAYTON, OHIO.

TREE-TRIMMER.

SPECIFICATION forming part of Letters Patent No. 673,105, dated April 30, 1901.

Application filed January 21, 1901. Serial No. 44,183. (No model.)

*To all whom it may concern:*

Be it known that I, WESLEY YOUNG, a citizen of the United States, residing at Dayton, in the county of Montgomery and State of Ohio, have invented certain new and useful Improvements in Tree-Trimmers, of which the following is a specification.

My invention relates to an improvement in a device for trimming the branches of trees and shrubbery.

The features of my invention will be more fully set forth in the description of the accompanying drawings, forming a part of this specification, in which—

Figure 1 is a side elevation of my improvement. Fig. 2 is an end view of the same. Fig. 3 is a section on line $xx$, Fig. 2. Fig. 4 is a section on line $yy$, Fig. 1. Fig. 5 is a sectional view of the tube for the flexible shaft. Fig. 6 is a side elevation of a modified form of finger-rest.

My improvement provides means for driving by power a rotary saw for trimming trees and shrubbery.

My invention involves a sleeve or handle A, consisting of a rigid tube.

B represents the flexible shaft connected to any suitable power device. $c$ represents a pulley for driving this shaft. On the end of this shaft is a housing or journal-box C, in which is seated the bevel-gear D on the end of a shaft K, connected to the flexible shaft, and a bevel-gear E in mesh with gear D, gear E being fixed to a transverse shaft F, journaled in said housing C. To the end of the said shaft F is fixed a rotary saw G, provided with sheaths $ll$ in the shape of quadrants, extending from the center of the saw on one side over the periphery (see Figs. 4 and 6) of the saw to the center of the saw on the other side, thus leaving only the cutting edges $mm$ of the saw exposed. This is in order to protect hacking or injuring of the trees. The housing is extended to each side of the handle to protect the rotary part.

H represents a finger-rest on the end of the housing contiguous to the rotary saw and extended to the front and rear of the saw, being bent outwardly at the points $dd$ to form a guard for the cutting edge of the saw.

I represents a finger-rest on the opposite end of the housing projected out beyond the end of said housing to form a coacting rest with the member H.

In Fig. 6 I have shown the preferred form of the finger I, which is fixed to a sleeve M, which sleeve is mounted to rotate on the handle A adjacent to the housing C. Fig. 6 shows the shaft and sleeve broken in two. The end of this sleeve is provided with notches O, engaging with the notches O' on the handle A. It is obvious that the sleeve may be freed from this clutch and the sleeve M rotated so as to adjust the finger to any position around the housing demanded by the nature of the work and fixed in its adjusted position by engaging the notches of the sleeve with the fixed notches on the handle.

In operation the two fingers H I are always upon a limb to be trimmed, thus making a firm brace and rest, which insures a perfect action of the saw. By this means there is no possibility of the saw wabbling or turning in the hand and it requires no effort whatever to hold the saw in cutting position. All that the operator has to do is to move the saw in the direction in which the limb is to be cut. This saw can cut either forward or rearward. If the cut is to be to the rear, the handle itself, coöperating with the rear end of the finger I, forms a brace or guide holding the saw securely in position for this possible action.

This device is light, cheap, durable, and thoroughly efficient. It can be shortened or lengthened and is portable.

I believe I am the first to invent a portable power device for trimming trees and shrubbery possessing utility and advantages such as the device just described.

Having described my invention, I claim—

1. In a device for trimming trees, a tubular handle, a flexible shaft, a shaft within said handle, means for driving said shaft, a bevel-gear on the end of said shaft, a shaft transverse to said flexible shaft, a gear on the end of the transverse shaft in mesh with the gear on the flexible shaft, a rotary saw fixed to the said transverse shaft, and a finger projected in proximity to said rotary saw, adapted to form a rest, substantially as described.

2. In a device for trimming trees, a tubular handle, a flexible shaft, a shaft within said handle, means for driving said shaft, a bevel-gear on the end of said shaft, a shaft transverse to said flexible shaft, a gear on the end of the transverse shaft in mesh with the gear on the flexible shaft, a rotary saw fixed to the said transverse shaft, sheaths for said saw leaving a cutting edge exposed, and a finger projected in proximity to said rotary saw adapted to form a rest, substantially as described.

3. In a device for trimming trees, a tubular handle, a flexible shaft, a shaft within said handle, means for driving said shaft, a bevel-gear on the end of said shaft, a shaft transverse to said flexible shaft, a gear on the end of the transverse shaft in mesh with the gear on the flexible shaft, a rotary saw fixed to the said transverse shaft, and an adjustable finger projected in proximity to said saw adapted to form a rest, substantially as described.

4. In a device for trimming trees, a tubular handle, a flexible shaft, a shaft within said handle, means for driving said shaft, a bevel-gear on the end of said shaft, a shaft transverse to said flexible shaft, a gear on the end of the transverse shaft in mesh with the gear on the flexible shaft, a rotary saw fixed to the said transverse shaft, an adjustable finger, projected in proximity to said rotary saw adapted to form a rest, and means for releasing and securing the same, substantially as described.

5. In a device for trimming trees, a tubular handle, a flexible shaft, a shaft within said handle, means for driving said shaft, a bevel-gear on the end of said shaft, a shaft transverse to said flexible shaft, a gear on the end of the transverse shaft in mesh with the gear on the flexible shaft, a rotary saw fixed to the said transverse shaft, a sleeve swiveled on the handle, a finger on the sleeve projected in proximity to said rotary saw adapted to form a rest, and means for adjusting said sleeve, substantially as described.

6. In a device for trimming trees, a tubular handle, a shaft passing through the same, means for rotating said shaft, a bevel-gear on the end of said shaft, a shaft transverse to said shaft, a gear on the end of the transverse shaft in mesh with the gear on the first-named shaft, a rotary saw fixed to the said transverse shaft, and a finger projected in proximity to said rotary saw adapted to form a rest, substantially as described.

7. In a device for trimming trees, the combination of a tubular handle, a shaft in said handle, a transverse shaft, bevel-gears on said shafts, a saw fixed to the transverse shaft, and a finger projected in proximity to the saw adapted to form a rest, substantially as described.

8. In a device for trimming trees, a tubular handle, a shaft therein, a housing on the end of said handle, a transverse shaft journaled in said housing, intermeshing bevel-gears fixed respectively to said shafts within said housing, a rotary saw fixed to the transverse shaft projected through the housing, and a finger projected from the housing in proximity to the saw adapted to form a rest, substantially as described.

9. In a device for trimming trees, a tubular handle, a shaft therein, means for driving said shaft, a transverse shaft at the end of said handle, intermeshing gears fixed respectively to said shafts, a rotary saw fixed to the transverse shaft, one or more fingers projected in proximity to said saw adapted to form a rest, whereby the saw may be fed to cut in either direction without deviation from the cutting plane, substantially as described.

10. In a device for trimming trees, a tubular handle, a shaft therein, means for driving said shaft, a housing at the end of said handle, a transverse shaft journaled in said housing, intermeshing bevel-gears fixed to said shafts within the housing, a rotary saw fixed to said transverse shaft projected through the housing, one or more fingers adapted to form a rest, whereby the saw may be operated to cut in either direction without deviation from the cutting plane, substantially as described.

11. In a device for trimming trees, a tubular handle, a shaft therein, means for driving said shaft, a housing at the end of said handle, a transverse shaft journaled in said housing, intermeshing bevel-gears fixed respectively to said shafts within said housing, a rotary saw fixed to said transverse shaft projected through the housing and a finger projected from the housing to each side of the saw, and curved at the extremities to overlie and guard the peripheral cutting edges of the saw, substantially as described.

In testimony whereof I have hereunto set my hand.

WESLEY YOUNG.

Witnesses:
OLIVER B. KAISER,
PEARL MCMICHAEL.